United States Patent [19]

Kimball et al.

[11] 3,852,014

[45] Dec. 3, 1974

[54] PLASTIC MOLDING MACHINE

[75] Inventors: Jerome Watis Kimball; Kenny Harrell Kimball, both of Savannah, Ga.

[73] Assignee: Permacraft Corporation, Savannah, Ga.

[22] Filed: Mar. 14, 1973

[21] Appl. No.: 341,239

[52] U.S. Cl............ 425/388, 425/384, 425/DIG. 48
[51] Int. Cl............................................. B29c 17/00
[58] Field of Search........................... 425/984, 388

[56] References Cited
UNITED STATES PATENTS

| | | | |
|---|---|---|---|
| 2,814,074 | 11/1957 | Butzko............................. | 425/388 |
| 2,836,852 | 6/1958 | Butzko............................. | 425/388 X |
| 3,107,396 | 10/1963 | Flower et al..................... | 425/388 X |
| 3,133,314 | 5/1964 | Arnould et al.................... | 425/388 |
| 3,225,387 | 12/1965 | Angilello et al.................. | 425/388 X |
| 3,307,222 | 3/1967 | Baldwin et al.................... | 425/388 X |
| 3,317,960 | 5/1967 | Kramer............................. | 425/388 X |
| 3,368,243 | 2/1968 | Kohen.............................. | 425/388 |
| 3,467,741 | 9/1969 | Kesling........................... | 425/388 X |
| 3,482,281 | 12/1969 | Thiel.............................. | 425/388 X |
| 3,553,784 | 1/1971 | Shuman........................... | 425/384 X |

Primary Examiner—J. Howard Flint, Jr.
Attorney, Agent, or Firm—Cushman, Darby & Cushman

[57] ABSTRACT

An improved vacuum molding apparatus, particularly for forming plastic signs or the like, of the type having a heater unit which can be manually pulled to a position over a sheet of plastic held in a frame to soften it, a forming bed on which molds are placed including an upwardly extending edge for providing a positive seal with a softened plastic sheet when the frame is moved slightly past the edge, a vacuum system for removing air from the space between the bed and a softened sheet to pull the softened sheet down around the mold and means for raising and lowering the frame and sheet wherein the forming bed is provided with channels for guiding air flow out of the system as rapidly as possible so that the softened sheet is quickly pulled onto the mold, the heater unit has a heating element shaped and mounted to particularly heat the sheet portion which engages the upper edge in order to ensure an excellent seal, and the vacuum pressure used to pull the sheet about the mold is also employed to raise and lower the frame and sheet.

37 Claims, 8 Drawing Figures

PLASTIC MOLDING MACHINE

BRIEF DESCRIPTION OF THE PRIOR ART AND SUMMARY OF THE INVENTION

The invention relates to a vacuum molding apparatus which is particularly designed for producing plastic molded signs or the like.

Many types of machines have been developed in the past for vacuum molding sheets of plastic into signs. For example, in an article entitled "*VACUUM FORMING*," which appeared in *Modern Plastics* in May 1954, a machine is schematically illustrated in which a heater unit is pulled over a sheet of plastic material mounted in a frame until the material has softened. At that point, the plastic sheet is moved vertically downward to a position over a raised mold on a forming bed with the frame holding the plastic material moving slightly past the upper edges of the forming bed so that the softened plastic engages the edges to provide a positive seal. A vacuum is then applied to the interior space between the softened plastic and the bed to pull the softened plastic down onto the raised mold to form the sign. Positive pressure is thereafter used to help remove the cooled plastic.

A number of patents in the prior art describe machines of this general type and specific improvements thereof. For example, the Kesling U.S. Pat. No., 3,467,741, describes an arrangement in which sealing is provided by drawing a frame past the edges of a sealing bed. Similarly, in Stratton, Jr., U.S. Pat. No. 2,973,558, the frame is drawn past the upper edges of the mold. The U.S. Pat. Nos. to Kramer, 3,317,960, Kohen, 3,368,243, and Weber, 2,911,677, show other systems of this general type.

None of these prior art systems, however, has found wide acceptance in the marketplace. Hitherto, it has not been possible to produce signs with very great detail, and without such detail plastic molded signs are not readily competitive with wood, metal and other signs which are generally considered more aesthetically pleasing to the eye. Further the above mentioned process has in the past been lengthy with a great deal of time being required to soften the plastic, apply the vacuum and remove the signs.

The present invention relates to improvements in an apparatus of this type by which signs of great detail and high quality can be rapidly produced. It has been discovered that in order to produce a high quality sign with very small details, the softened plastic must be pulled very rapidly down onto the form while it is still as fluid as possible and can be pulled into very small crevices of the mold to provide high detail resolution. This is accomplished according to the improvements of this invention in several ways.

First, an excellent seal is provided between the softened plastic and the edges of the forming bed, not only by pulling the plastic sheet slightly past the upper edges of the forming bed to provide a positive seal, but by also heating the sheet particularly around the peripheral location where it engages the upwardly extending edges of the forming bed. This insures a particularly good seal with very little air leakage into the forming bed. Minimizing air leakage into the forming bed, of course, helps to minimize the time during which the air is withdrawn from the forming bed which in turn pulls the plastic material down onto the mold while it is still as soft as possible.

Further, in order to reduce to an absolute minimum the time required to pull the softened plastic down onto the mold, the forming bed is specifically constructed to remove the air therein as rapidly as possible. As discussed in detail below, the forming bed includes a number of component. A bottom tray having a number of transversely extending grooves is provided with a connection in roughly the center thereof to a vacuum surge tank and has upwardly extending walls which define the upper edges of the bed with which the softened plastic engages. A wire mesh screen or the like lies on the grooved bottom of the tray with a further grooved board, for example, of masonite or the like resting atop the wire mesh screen. On top of the grooved sheet, a sheet of material which may be formed of thin wood or the like with corduroy material fastened atop it provides the base upon which molds are placed. Letters, numerals, logos or any shapes can be simply placed on the corduroy sheet for molding. The molds can be made of virtually any material -- metals, ceramic, wood, etc.

The transverse grooves in the bottom of the tray and the similar grooves in the board atop the wire mesh guide the air flow out of the interior space when a vacuum is applied. Air also flows along the grooves provided by the corduroy. All of these pathways for the air together with the vertical pathways provided by the mesh and the apertures through the grooved board permit the air to be removed very rapidly from the interior space between the softened plastic sheet and forming bed, and accordingly to pull the plastic down into the interstices of the mold.

Further, to also assist in removing air as quickly as possible, the system includes, in combination with the other features mentioned above, a large vacuum surge tank, for example, twenty gallons, which is continuously maintained by a vacuum pump at a low pressure. When the softened material has been lowered onto the forming bed and is positively sealed on the upper edge of the tray as discussed above, the vacuum surge tank is then connected to the interior of the bed and very rapidly dilutes the small amount of air trapped between the soft plastic sheet and tray with the very large volume of the surge tank.

According to another aspect of the invention, the machine is kept as simple and reliable as possible by using the vacuum pressure which is necessarily required for molding to also raise and lower the plastic sheet of material. A hydraulic jack or the like is connected by one or more solenoids to the surge tank and to a pair of electrical switches mounted on the exterior of the unit. The hydraulic jack is provided with an interior piston and defines a space above and below that piston. When the raise button is manually operated, the solenoids operate to connect the vacuum to the space above the hydraulic cylinder while connecting the space below the hydraulic cylinder to atmospheric pressure. The resultant differential pressure operates to move the piston and the frame bearing the plastic sheet of material upward, for example, to a position immediately under the heaters for softening the plastic or to an intermediate position for removing molded and cooled signs and substituting a fresh sheet of plastic. Conversely, when the lower button is operated, the solenoids simply operate to connect the upper portion to the atmosphere and the lower portion to the vacuum surge tank creating an opposite differential pressure which lowers the hydraulic piston and the plastic frame holder connected to it.

Many other objects and purposes of the invention will become clear from the following detailed description of the drawings.

DETAILED DESCRIPTION OF THE DRAWINGS

As mentioned briefly above, the apparatus of this invention includes a heater unit which softens the sheet of plastic material, a frame for holding the sheet of plastic material as it is softened and as it moves vertically, a forming bed on which the molds are placed and over which the softened sheet is pulled to provide a positive seal, a simple arrangement for raising and lowering the frame between an upper position immediately beneath the heater for softening an intermediate position in which the frame can be loaded with a fresh plastic sheet and a formed sheet removed and a lower position in which a softened sheet positively engages the upwardly extending edges of the forming sheet, and a simple vacuum system for evacuating quickly and fully the interior space of the forming bed to draw a softened sheet of plastic around the mold and also to operate the mechanism by which the frame and plastic sheet are raised and lowered.

Figure 1:
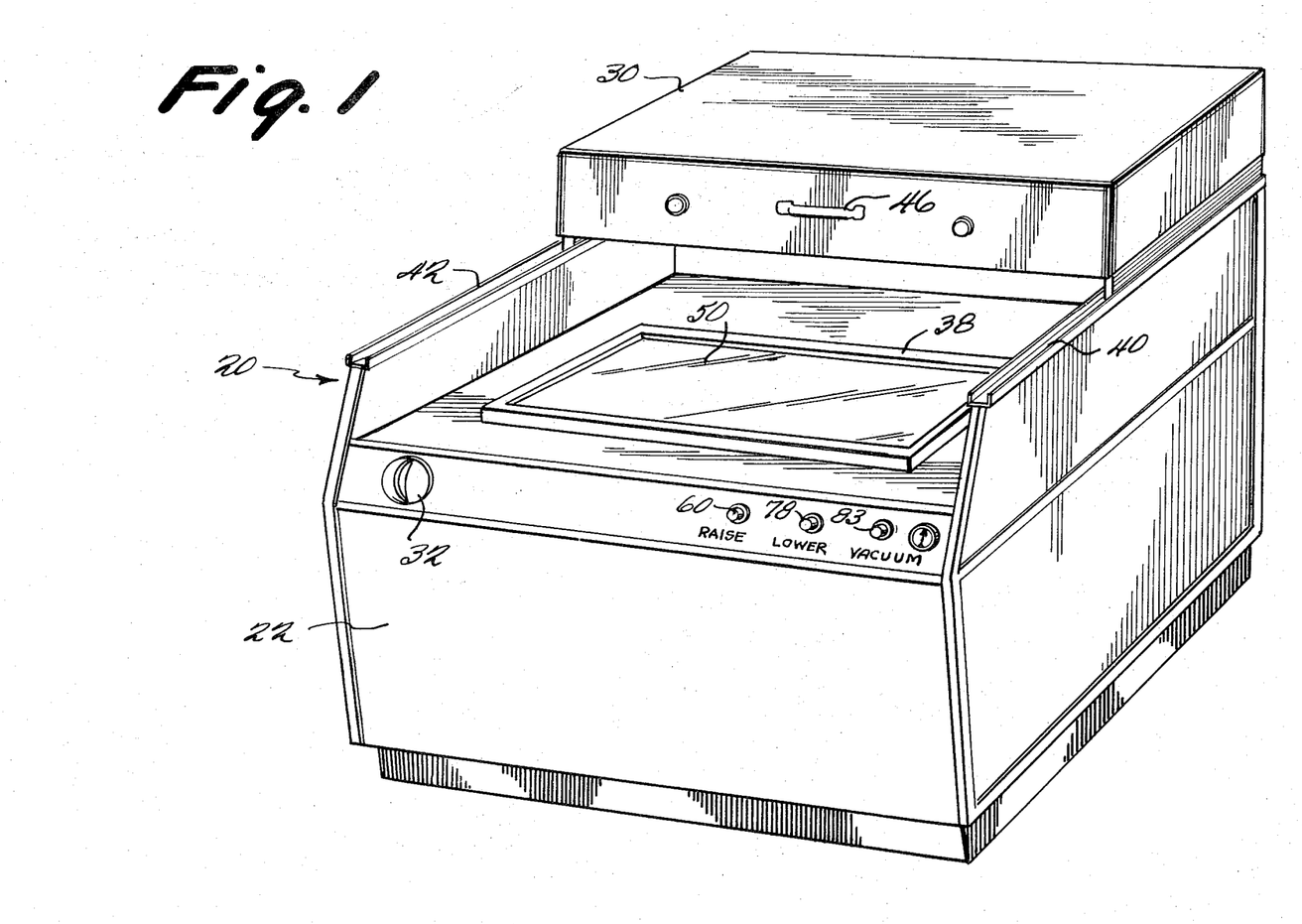
FIG. 1 shows a perspective view of the exterior of the novel machine of this invention.
Figure 2:
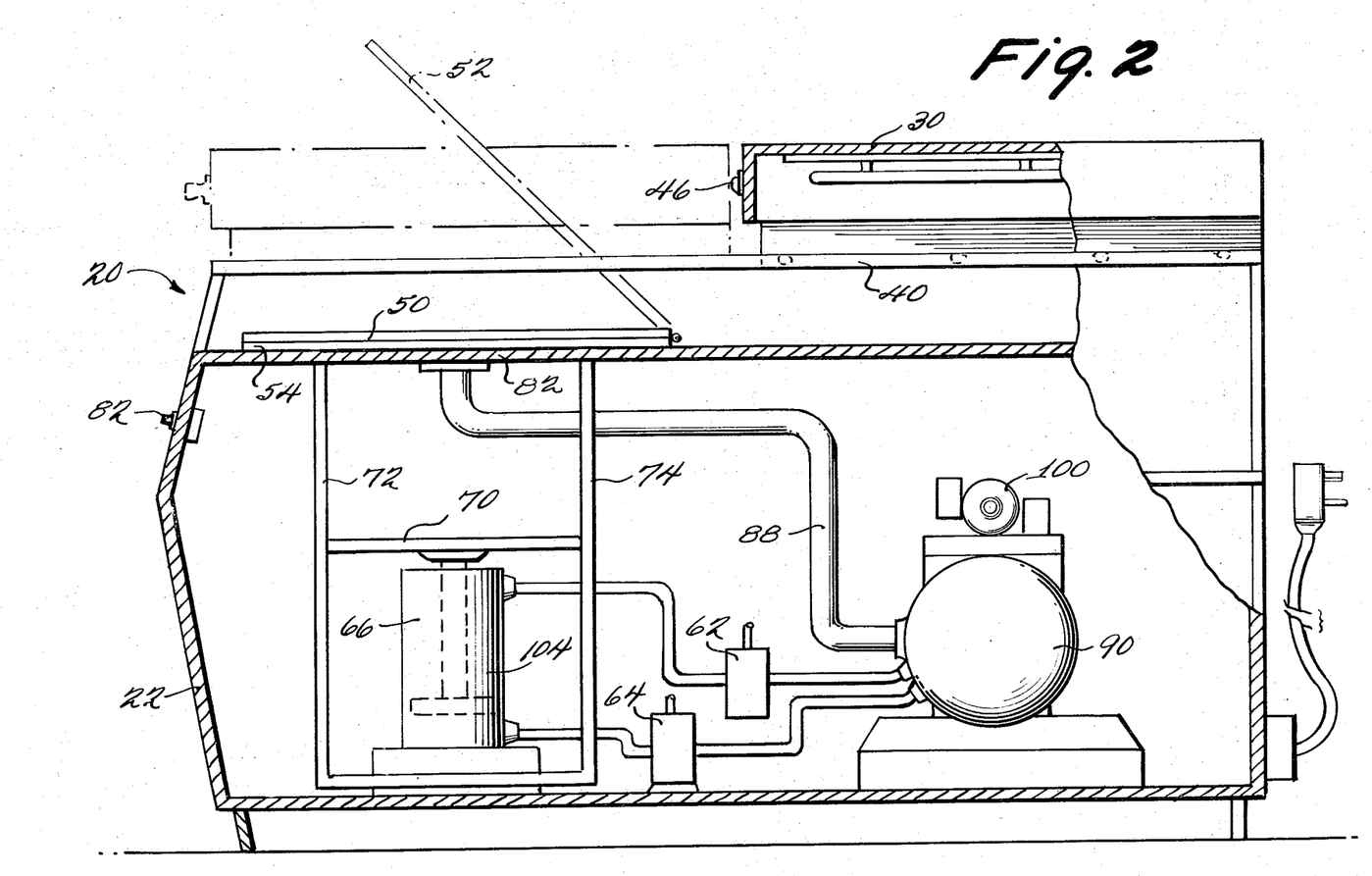
FIG. 2 shows a cut-away side view of the machine of FIG. 1 showing the mechanism by which the plastic sheet frame is raised and lowered.
Figure 3:
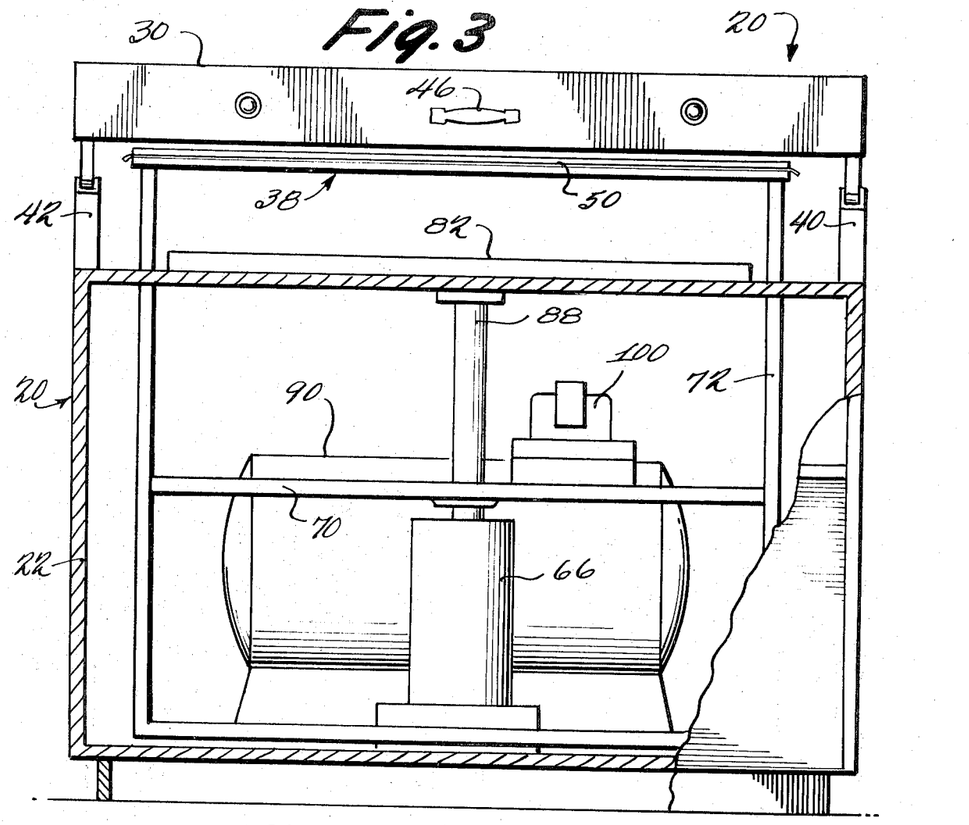
FIG. 3 shows a cut-away front view of the machine of FIG. 1.
Figure 4:
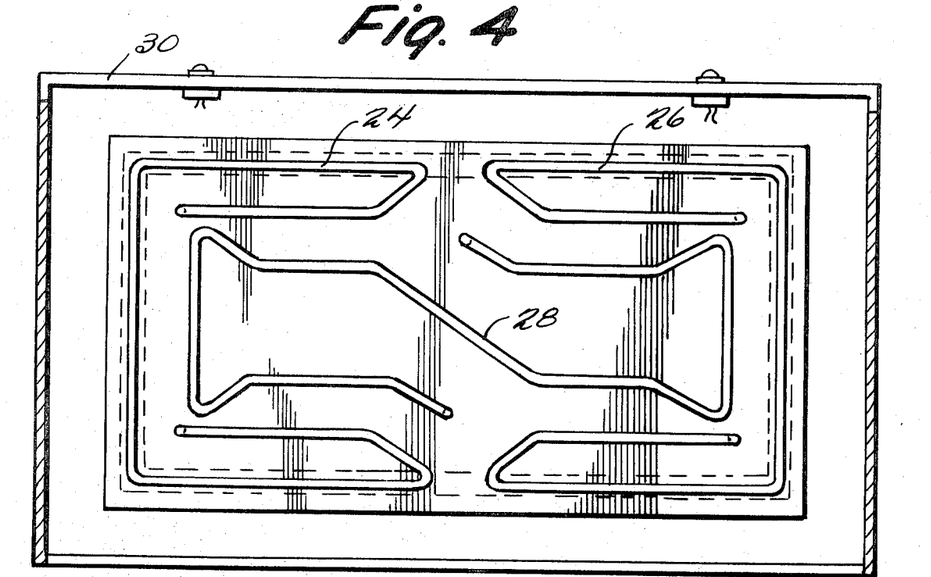
FIG. 4 shows a bottom view of the heater element for softening the plastic sheet.

As can be seen in FIGS. 1-3, apparatus 20 is provided with a housing 22 which can be simply constructed from aluminum struts and plastic or wooden panels to house the system elements. As can be seen in FIG. 4, the heater comprises three rods 24, 26 and 28 of electrically resistive material such as now conventionally used in electrical ovens and the like. These rods are mounted by appropriate insulators to within heater housing 30 which is open at the bottom. Rods 24, 26 and 28 are connected to an appropriate electrical source for resistive heating upon operation of manual switch 32 mounted on the exterior of housing 22. Switch 32 includes a conventional timer unit for automatically heating for a given time period, for example, one or two minutes depending on sheet thickness and providing an alarm in the form of a buzzer or bell at the end of that time interval. Use of the timer in this fashion prevents overheating of the plastic sheet.

As mentioned above, rods 24, 26 and 28 are bent and mounted within the housing 30 in a particularly advantageous arrangement. When a plastic sheet of material in frame 38 has been elevated to a position immediately below heating rods 24, 26 and 28, the areas of that plastic sheet lying immediately below the area indicated in dashed lines in FIG. 4 is particularly well heated and softened. This area is the area which engages the upper edge of the tray of the forming bed as will be discussed detail below to provide the positive seal. In order to make sure that that seal is indeed as tight as possible, it is important that the engaging area be completely softened and flexible, so that any air leakage will be immediately terminated by the flow of plastic material down onto the edge of the tray of the forming bed. It should be noted in FIG. 4 that rods 24 and 26 substantially extend within this peripheral region. Since the heat tends to flow to the central portion of the heater, lesser rod area is required in the center.

Heater housing 30, and rods 24, 26 and 28 mounted within it, are horizontally movable along a pair of rails 40 and 42 from a storage position as illustrated in FIG. 1, where it is out of the way and in no way interferes with loading and unloading of plastic sheets from frame 38, to a forward position immediately over frame 38 in which that frame can be raised as discussed below to heat and soften a plastic sheet. The forward position is illustrated in dashed lines in FIG. 2. Handle 46 is provided on the front of heater housing 30 for manually pushing and pulling the heater back and forth, and this can be accomplished with ease, for example, by roller bearings or the like which engage rails 40 and 42.

To initiate a cycle, a cold sheet of plastic material 50 is placed in frame 38 by pivoting the upper portion 52 of frame 38 upwards as shown in dashed lines in FIG. 2 to place the plastic sheet, and thereafter pulling it downward and latching together upper portion 52 and the lower portion 54 with sheet 50 between them by any means, for example, by simple clamps (not shown). Heater housing 30 and its rods 24, 26 and 28 are then manually pulled by handle 46 to the position indicated in dashed lines in FIG. 2 immediately over frame 38 and the cold plastic sheet 50. Frame 38 is then raised by manual operation of raise switch 60 on the exterior of housing 22 which operates solenoid valves 62 and 64, illustrated schematically in FIG. 2, which in turn cause hydraulic cylinder 66 to move frame 38 upward by exerting a force on cross strut 70 which is connected to frame 38 via struts 72 and 74. Appropriate limit switches can be provided if desired for preventing frame 38 from moving too far upward and damaging rods 24, 26 and 28. When frame 38 and sheet 50 which it holds are in a position immediately below heater rods 24, 26 and 28, timer 32 is turned on for a predetermined interval of, for example, one to three minutes depending on the thickness of plastic sheet 50. At the end of this time interval, sheet 50 is soft, extremely pliable and ready to be formed.

Clamping frame 38 is now lowered by manually operating lower switch 78 to cause the solenoid valves 62 and 64, as discussed in greater detail below, to operate hydraulic cylinder 66 in the opposite direction and lower frame 38. Frame 38 is lowered until the edges 38 are slightly past the upper edge 80 of tray 82 which forms a portion of forming bed 84. Limit switches can be provided if desired for automatically stopping descent at that point. As can be easily seen in FIG. 7, pulling plastic sheet 50 past the upwardly extending edge 80 of tray 82 automatically provides a positive seal without the necessity of additional clamps or other structure.

Figures 5, 7:
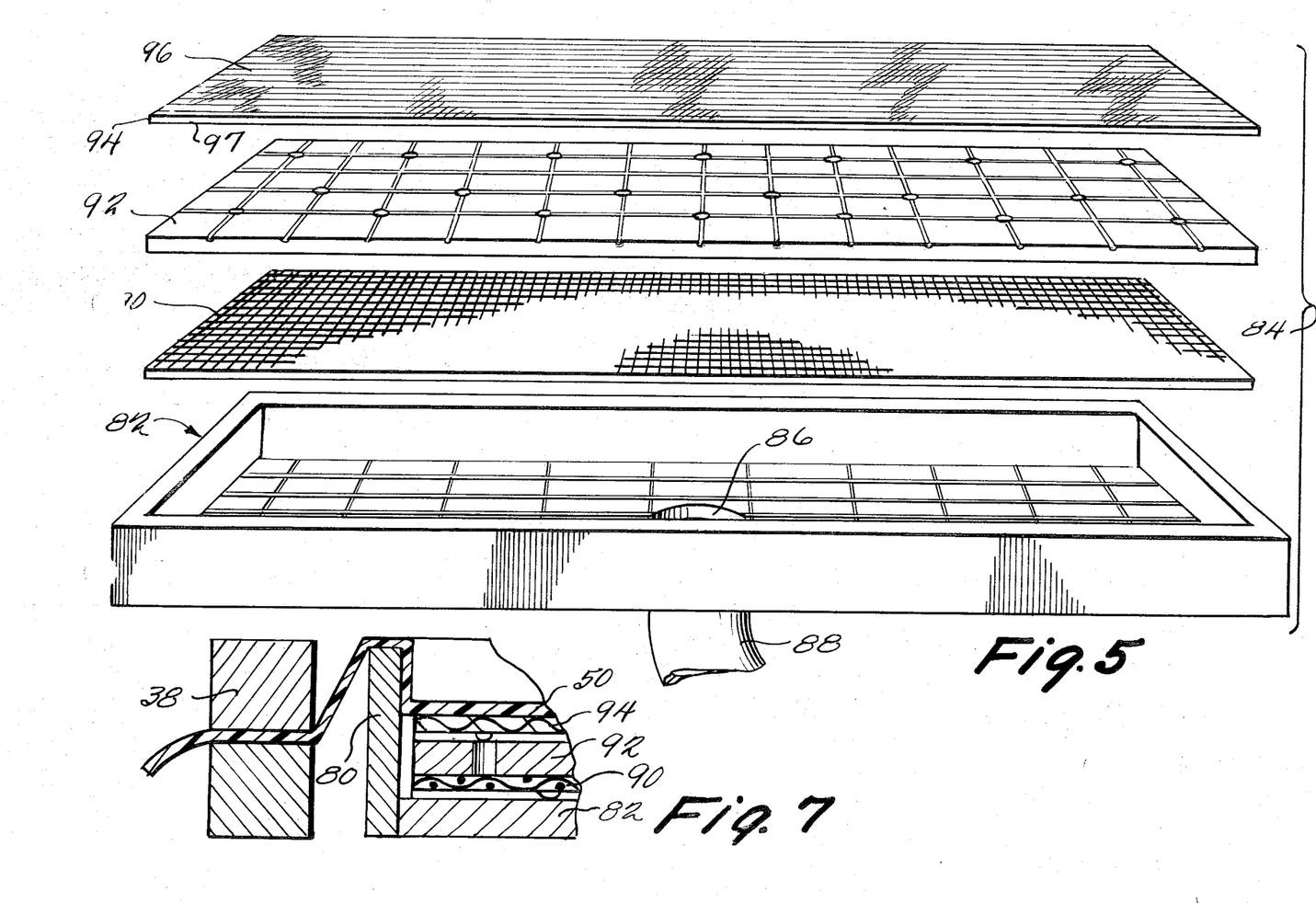
FIG. 5 shows an exploded view of the novel forming bed.
FIG. 7 shows a view of a plastic sheet positively sealed on the forming bed.
Figure 6:
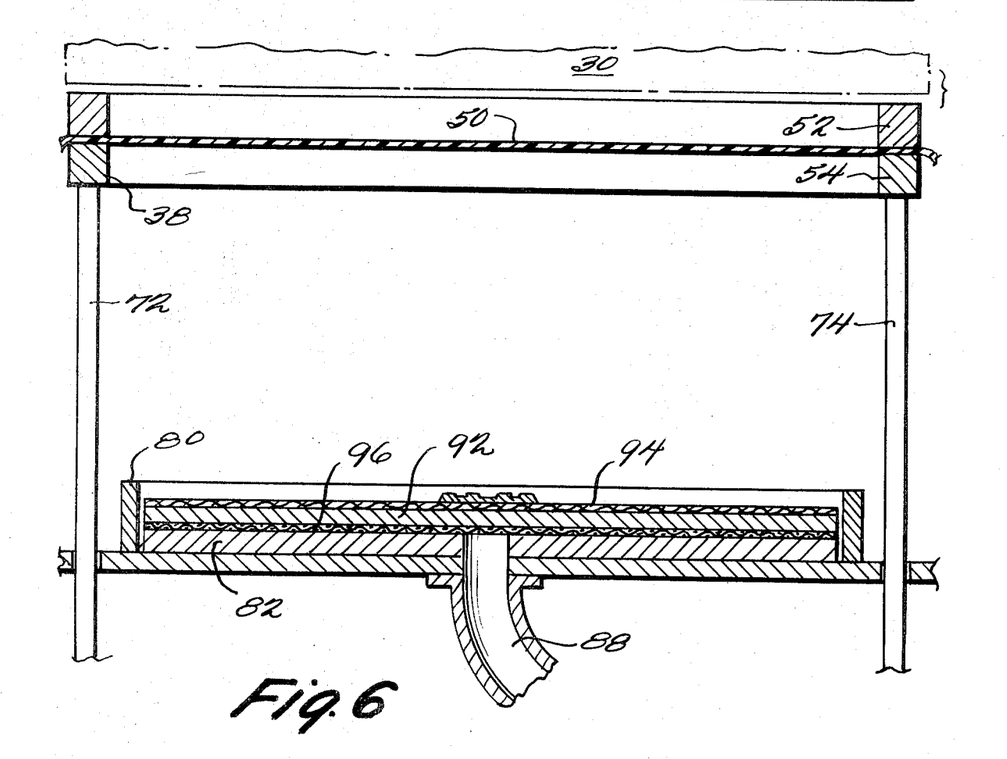
FIG. 6 shows a cut-away view of the forming bed and plastic sheet holding frame.
Figure 8:
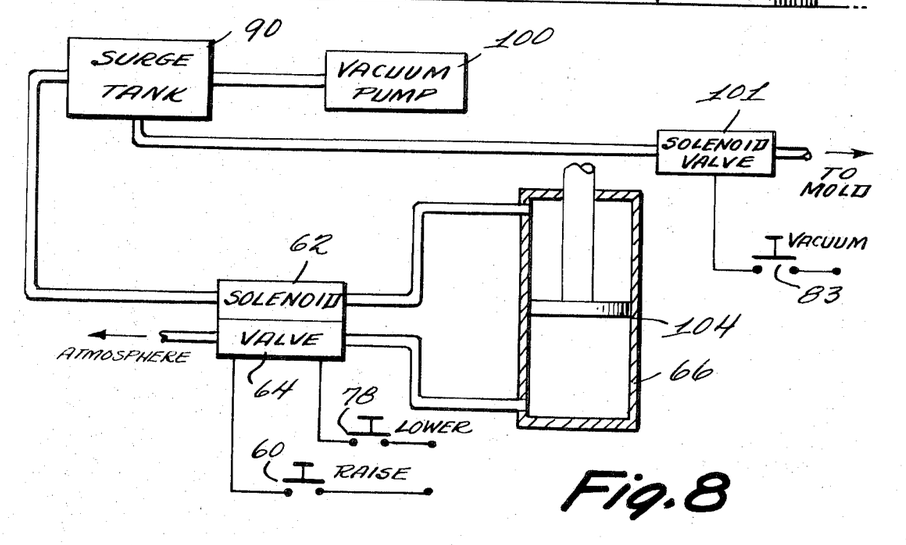
FIG. 8 shows a schematic view of the electrical and hydraulic circuitry for raising and lowering the sheet holding frame.

Vacuum switch 83 is now manually operated to cause withdrawal of air from the sealed space between plastic sheet 50 and tray 82. As mentioned briefly above, forming bed 84 is specifically designed to encourage egress of the air therein as rapidly as possible so that softened sheet 50 is quickly pulled down onto the mold before it has a chance to harden. Referring to FIG. 5, the forming bed includes a tray 82 which is provided with upwardly extending edges 80 around its periphery which provides a positive seal as discussed above. Near its center, tray 82 has an aperture 86 directly connecting to a line 88 which in turn connects to a conventional vacuum surge tank 90 as can be best seen in FIG. 2. A plurality of grooves are formed in the bottom of the tray 82 to channelize flow of the air toward center aperture 86 for removal and to prevent, as much as possible, air from being trapped within forming bed 84. A wire mesh screen 90 lies on the bottom of tray 82 and functions to provide channels for vertical flow of the air and to prevent formation of air pockets. On top of wire mesh screen 90, a wooden or other board 92 is provided, also having transverse grooves with apertures at some of the groove junctions for channelizing flow downward through the forming bed.

On top of board 92 yet another board 94 is provided and this is preferably comprised of corduroy textile material 96 or the like which is attached, for example, by glue or otherwise to a porous sheet of material 97. It is on corduroy material 96 that the molds can be simply placed without permanent or other attachment. These molds can comprise letters, numerals, designs or in fact virtually any object which is desired to be copied. The corduroy ridges of material 96 also provide channels along which air can flow thereafter down through the other elements of forming bed 84 and out line 88. Further, the air can flow through porous corduroy 96 and down through the other elements. All channelizing structure operates to very effectively remove air.

Further, quick removal of the air is assisted by using a surge tank 90, for example, a 20 gallon surge tank which has already been evacuated to a low pressure by a conventional vacuum pump 100. Thus, when switch 82 on the exterior of housing 22 is manually pushed, the very small volume of air defined between softened plastic sheet 50 and tray 82 is diluted via solenoid valve 101 shown in FIG. 7 with the very large volume at a high vacuum within surge tank 90, so that plastic sheet 50 is very rapidly pulled down around any molds on corduroy 96.

After formed plastic sheet 50 has cooled, which takes a very short period of time, Raise button 60 on the exterior of housing 22 is again operated to raise frame 38 and the formed sheet of plastic 50 to the intermediate position illustrated in FIG. 1 for removal of the formed plastic sign. A fresh sheet of cold plastic material can now be substituted and the above steps repeated. Since corduroy sheet 96 on which the molds actually rest is not fastened in the forming bed and can be easily removed, it is frequently desirable to use at least two boards 94. While one is in use, new molds can be arranged on the other board and that board then quickly subsituted after a plastic sign is removed to permit almost continuous operation of the machine. The entire cycle, including insertion of the plastic sheet, softening of that sheet, raising and lowering the same, removing air to form the signs, cooling in place, and removing the sign takes only one to three minutes.

As indicated above, using the vacuum pressure which the machine needs for molding to raise and lower the frame, rather than providing an additional source of positive pressure, represents a considerable improvement both in economy and reliability. For example, as illustrated in the schematic of FIG. 7, commercially available solenoid valves 62 and 64 connect to the interior of hydraulic cylinder 66 above and below piston 104 for developing a differential pressure which raises and lowers that piston and frame 38 coupled to it. Raise and lower switches 78 and 60 are operated to connect the solenoid valves in two different configurations. In configuration which results when Lower button 78 is operated, the upper space within hydraulic cylinder 66 is connected to the atmosphere while the lower space is connected to surge tank 90 so that the resultant differential pressure lowers piston 104 and the attached frame 38. Conversely, when Raise switch 60 is operated solenoid valves 62 and 64 connect the interior of cylinder 66 below piston 104 to the atmosphere while the upper space is connected to surge tank 90 and piston 104 moves upward carrying frame 38 with it.

Many changes and modifications in the above described embodiment of the invention can, of course, be carried out without departing from the scope thereof. Accordingly, that scope is intended to be limited only by the scope of the appended claims.

What is claimed is:

1. A vacuum molding apparatus comprising:
   frame means for receiving and holding a plastic sheet,
   heater means mounted for heating and softening said sheet,
   a forming bed having a mold receiving surface for receiving a mold, and means defining a plurality of vertical and horizontal air channels for guiding air being removed from said bed including a tray having a bottom floor with an opening for removing air, side walls extending upwardly from said floor to define a continuous peripheral edge, said floor having a plurality of grooves for channelizing air flow,
   a mesh screen lying on said floor,
   a further board lying atop said mesh screen and having grooves on the surface remote from said screen for channelizing air flow, and apertures extending therethrough, and
   a composition board lying atop said further board having a corduroy upper surface on which molds can be placed as desired with the corduroy ridges also channelizing air flow.
   vacuum means connected to said forming bed for removing air from a space between a softened plastic sheet and said bed to cause said softened sheet to be drawn about a mold on said mold receiving surface, and
   means for moving said frame means and a held sheet between a position adjacent said heater means for softening and a position engaging said forming bed for molding a softened sheet about a mold.

2. An apparatus as in claim 1 wherein said composition board is removable.

3. An apparatus as in claim 2 wherein said opening of said grooved floor of said tray is connected to said vacuum means.

4. An apparatus as in claim 1 wherein said vacuum means includes a surge tank connected to said forming bed and a vacuum pump connected to said surge tank.

5. A apparatus as in claim 1 wherein said moving means includes a manually operable raise switch and a manually operable lower switch, a hydraulic cylinder mounted for raising and lowering said frame means including a piston connected to said frame means movable within a cylinder defining a space above and below said piston, control means, responsive to manual operation of said raise switch, for causing the atmosphere to be connected to said space below said piston and said vacuum means to said space above said piston to create a differential pressure causing said piston to raise said frame means and for causing, responsive to manual operation of said lower switch, the atmosphere to be connected to said space above said piston and said vacuum means to said space below said piston to create a differential pressure causing said piston to lower said frame means.

6. An apparatus as in claim 5 wherein said vacuum means includes a surge tank and a vacuum pump.

7. An apparatus as in claim 1 further including means for mounting said heater means for horizontal movement between a storage position and a position above said frame means and wherein said moving means moves said frame means vertically.

8. An apparatus as in claim 7 wherein said heater means includes a housing open at the bottom, and at least a single resistive heater rod mounted in said housing and wherein said heater mounting means includes a pair of rails along which said heater housing can be manually and horizontally moved.

9. An apparatus as in claim 1 wherein said tray upwardly extending side walls define a continuous peripheral edge and includes means for engaging said softened sheet and providing a positive seal.

10. An apparatus as in claim 8 wherein said heater rod is shaped and mounted to extend substantially about the periphery of a rectangle which matches said continuous peripheral edge defined by said walls so that the portion of said sheet which engages said continuous peripheral edge is fully and completely softened to ensure sealing.

11. An apparatus as in claim 10 wherein three heater rods are provided, two C-shaped rods extending substantially about the periphery of said rectangle and a center rod.

12. An apparatus as in claim 1 further including housing means for mounting said forming bed, heater means and moving means.

13. An apparatus as in claim 1 wherein said frame means includes an upper and lower frame portion pivotably connected together along one edge.

14. An apparatus as in claim 1 wherein said plurality of grooves in said tray bottom include a first set of grooves extending parallel to each other and a second set of grooves extending parallel to each other and perpendicular to said grooves of said first set.

15. An apparatus as in claim 1 wherein said grooves of said further board include a first set extending parallel to each other and a second set extending parallel to each other and perpendicular to said grooves of said first set and wherein said apertures are located at the intersections of grooves of said first and second sets.

16. An apparatus as in claim 1 wherein said composition board is porous.

17. A forming bed for vacuum molding comprising:
a tray having a bottom floor with an opening for removing air and side walls extending upwardly from said floor to define a continuous peripheral edge, said floor having a plurality of grooves for channelizing air flow,
a mesh screen lying on said floor,
a further board lying atop said mesh screen and having grooves on the surface remote from said screen for channelizing air flow, and apertures extending therethrough, and
a composition board lying atop said further board having a corduroy upper surface on which molds can be placed as desired with the corduroy ridges also channelizing air flow.

18. A bed as in claim 17 wherein said plurality of grooves in said tray bottom include a first set of grooves extending parallel to each other and a second set of grooves extending parallel to each other and perpendicular to said grooves of said first set.

19. A bed as in claim 17 wherein said grooves of said further board include a first set extending parallel to each other and a second set extending parallel to each other and perpendicular to said grooves of said first set and wherein said apertures are located at the intersections of grooves of said first and second sets.

20. A bed as in claim 17 wherein said composition board is porous.

21. A vacuum molding apparatus comprising:
frame means for receiving and holding a plastic sheet,
a forming bed having a tray with upwardly extending side walls defining a continuous, peripheral edge which engages a softened sheet and provides a positive seal.
heater means mounted for heating and softening said sheet, including a housing open at the bottom and at least a single register rod mounted in said housing and shaped to extend substantially about the periphery of a rectangle which matches said continuous edge so that the portion of said sheet which engages said continuous edge is fully and completely softened to ensure sealing,
vacuum means connected to said forming bed for removing air from a space between a softened plastic sheet and said bed to cause said softened sheet to be drawn about a mold, and means for moving said frame means and a held sheet between a position adjacent said heater means for softening and a position engaging said forming bed for molding a softened sheet about a mold including a manually operable raise switch and a manually operable lower switch, a hydraulic cylinder mounted for raising and lowering said frame means including a piston connected to said frame means movable within a cylinder defining a space above and below said piston, control means, responsive to manual operation of said raise switch, for causing the atmosphere to be connected to said space below said piston and said vacuum means to said space above said piston to create a differential pressure causing said piston to raise said frame means and for causing, responsive to manual operation of said lower switch, the atmosphere to be connected to said space above said piston and said vaccum means to said space below said piston to create a differential pressure causing said piston to lower said frame means.

22. An apparatus as in claim 21 wherein said forming bed includes a removable composition board with an upper corduroy surface onto which molds are placed, said corduroy surface defining horizontal air channels.

23. An apparatus as in claim 22 wherein said forming bed further includes a tray having a grooved bottom surface and an opening for connection to a vacuum source.

24. An apparatus as in claim 21 wherein said vacuum means includes a surge tank connected to said forming bed and a vacuum pump connected to said surge tank.

25. An apparatus as in claim 21 wherein said forming bed includes:
- a tray having a bottom floor with an opening for removing air and side walls extending upwardly from said floor to define a continuous peripheral edges, said floor having a plurality of grooves for channelizing air flow,
- a mesh screen lying on said floor,
- a further board lying atop said mesh screen and having grooves on the surface remote from said screen for channelizing air flow, and apertures extending therethrough, and
- a composition board lying atop said further board having a corduroy upper surface on which molds can be placed as desired with the corduroy ridges also channelizing air flow.

26. An apparatus as in claim 25 wherein said plurality of grooves in said tray bottom include a first set of grooves extending parallel to each other and a second set of grooves extending parallel to each other and perpendicular to said grooves of said first set.

27. An apparatus as in claim 25 wherein said grooves of said further board include a first set extending parallel to each other and a second set extending parallel to each other and perpendicular to said grooves of said first set and wherein said apertures are located at the intersections of grooves of said first and second sets.

28. An apparatus as in claim 25 wherein said composition board is porous.

29. An apparatus as in claim 21 further including means for mounting said heater means for horizontal movement between a storage position and a position above said frame means and wherein said moving means moves said frame means vertically.

30. An apparatus as in claim 29 wherein said heater mounting means includes a pair of rails along which said heater housing can be manually and horizontally moved.

31. An apparatus as in claim 21 wherein three heater rods are provided, two C-shaped rods extending substantially about the periphery of said rectangle and a center rod.

32. A vacuum molding apparatus comprising:
- frame means for receiving and holding a plastic sheet,
- a forming bed dimensioned to fit within the inside boundry of said frame means having a mold receiving surface including a upwardly extending side walls defining a continuous peripheral edge which engages a softened sheet and provides a positive seal,
- heater means mounted for heating and softening said sheet, including a heater element shaped and mounted to extend substantially about the periphery of a rectangle which matches said continuous peripheral edge defined by said side walls so that the portion of said sheet which engages said continuous peripheral edge is fully and completely softened to ensure sealing,
- vacuum means connected to said forming bed for removing air from a space between a softened plastic sheet and said bed to cause said softened sheet to be drawn about said mold, and
- means for moving said frame means and a held sheet between a first position adjacent said heater means for softening and a second position which engages said forming bed by moving the outside edges of said held sheet past said upwardly extending sidewalls thereby providing said positive seal and for thereafter molding a softened sheet about said mold.

33. An apparatus as in claim 32 wherein three heater rods are provided, including two C-shaped rods extending substantially about the periphery of said rectangle and a center rod.

34. An apparatus as in claim 32 wherein said tray has a bottom floor with an opening for removing air and side walls extending upwardly from said floor to define a continuous peripheral edge, said floor having a plurality of grooves for channelizing air flow, and wherein said forming bed further includes:
- a mesh screen lying on said floor,
- a further board lying atop said mesh screen and having grooves on the surface remote from said screen for channelizing air flow, and apertures extending therethrough, and
- a composition board lying atop said further board having a corduroy upper surface on which molds can be placed as desired with the corduroy ridges also channelizing air flow.

35. An apparatus as in claim 34 wherein said plurality of grooves in said tray bottom include a first set of grooves extending parallel to each other and a second set of grooves extending parallel to each other and perpendicular to said grooves of said first set.

36. An apparatus as in claim 34 wherein said grooves of said further board include a first set extending parallel to each other and a second set extending parallel to each other and perpendicular to said grooves of said first set and wherein said apertures are located at the intersections of grooves of said first and second sets.

37. An apparatus as in claim 34 wherein said composition board is porous.

* * * * *